US011986929B2

(12) United States Patent
Straub et al.

(10) Patent No.: US 11,986,929 B2
(45) Date of Patent: May 21, 2024

(54) HANDHELD MACHINE TOOL, IN PARTICULAR IMPACT DRIVER

(71) Applicant: Festool GmbH, Wendlingen (DE)

(72) Inventors: Benjamin Straub, Kuchen (DE); Alexander Lautenschläger, Esslingen (DE)

(73) Assignee: Festool GmbH, Wendlingen (DE)

( * ) Notice: Subject to any disclaimer, the term of this patent is extended or adjusted under 35 U.S.C. 154(b) by 443 days.

(21) Appl. No.: 17/262,120

(22) PCT Filed: Jun. 12, 2019

(86) PCT No.: PCT/EP2019/065405

§ 371 (c)(1),
(2) Date: Jan. 21, 2021

(87) PCT Pub. No.: WO2020/020531

PCT Pub. Date: Jan. 30, 2020

(65) Prior Publication Data

US 2021/0291329 A1 Sep. 23, 2021

(30) Foreign Application Priority Data

Jul. 27, 2018 (DE) ........................ 102018118196.5

(51) Int. Cl.
*B25B 21/02* (2006.01)

(52) U.S. Cl.
CPC .................................... *B25B 21/02* (2013.01)

(58) Field of Classification Search
CPC ......... B25B 17/00; B25B 19/00; B25B 21/00; B25B 21/002; B25B 21/02; B25B 21/026;
(Continued)

(56) References Cited

U.S. PATENT DOCUMENTS 3,175,660 A * 3/1965 Kaman .................. B25B 21/02
173/93
3,952,814 A * 4/1976 Gelfand .................. B25B 21/02
173/93
(Continued)

FOREIGN PATENT DOCUMENTS

DE 2543768 4/1977
DE 2543768 A1 4/1977
(Continued)

OTHER PUBLICATIONS

European Office Action dated Nov. 7, 2022.
Japanese Office Action of Jun. 13, 2023.

*Primary Examiner* — Robert J Scruggs
(74) *Attorney, Agent, or Firm* — Hoffmann & Baron, LLP

(57) ABSTRACT

A handheld machine tool, in particular an impact driver, having a drive train for driving a tool receptacle, provided for receiving a tool, in particular a screwdriver tool, about a rotation axis, wherein the drive train has a drive motor, an output shaft element, on which the tool receptacle is arranged, and a drive shaft, which is drivable by the drive motor, for driving the output shaft element, wherein the output shaft element is rotatably mounted by means of an output pivot bearing and the drive shaft is rotatably mounted by means of a drive pivot bearing about the rotation axis in respect of a machine housing, and wherein the output shaft element is rotatably mounted by means of a shaft bearing arrangement on the drive shaft about the rotation axis. The shaft bearing arrangement has at least two shaft bearings, which are arranged adjacent to each other in relation to the rotation axis and differ by at least one mechanical property.

29 Claims, 4 Drawing Sheets

(58) Field of Classification Search
CPC ..... B25B 23/00; B25B 23/14; B25B 23/1405; B25B 23/142; B25B 23/1427; B25B 23/145; B25B 23/147
See application file for complete search history.

(56) References Cited

U.S. PATENT DOCUMENTS

| | | | |
|---|---|---|---|
| 5,601,149 A | 2/1997 | Kawasaki et al. | |
| 5,722,785 A | 3/1998 | Diener | |
| 6,070,674 A | 6/2000 | Williamson et al. | |
| 7,080,578 B2 * | 7/2006 | Izumisawa | B25B 21/02 81/57.39 |
| 2012/0322605 A1 | 12/2012 | Hirabayashi | |
| 2017/0165817 A1 | 6/2017 | Vogt et al. | |

FOREIGN PATENT DOCUMENTS

| | | | |
|---|---|---|---|
| DE | 202007001274 | | 6/2007 |
| DE | 202007001274 | U1 | 6/2007 |
| DE | 102007003037 | | 7/2008 |
| DE | 102007003037 | A1 | 7/2008 |
| DE | 102017209013 | | 12/2018 |
| DE | 102017209013 | A1 | 12/2018 |
| EP | 1946892 | A2 | 7/2008 |
| JP | S51-121900 | | 10/1976 |
| JP | S52-043200 | | 4/1977 |
| JP | H08-168971 | A | 7/1996 |
| JP | 2000-006043 | A | 1/2000 |
| JP | 2013-000847 | A | 1/2013 |

* cited by examiner

HANDHELD MACHINE TOOL, IN PARTICULAR IMPACT DRIVER

This application claims priority based on an International Application filed under the Patent Cooperation Treaty, PCT/EP2019/065405, filed Jun. 12, 2019, which claims priority to DE 102018118196.5, filed Jul. 27, 2018.

BACKGROUND OF THE INVENTION

The invention relates to a handheld machine tool, in particular an impact driver, having a drive train for driving a tool receptacle, provided for receiving a tool, in particular a screwdriver tool, about a rotation axis, wherein the drive train comprises a drive motor, an output shaft element, on which the tool receptacle is arranged, and a drive shaft, which is drivable by the drive motor, for driving the output shaft element, wherein the output shaft element is rotatably mounted by means of an output pivot bearing and the drive shaft is rotatably mounted by means of a drive pivot bearing about the rotation axis in respect of a machine housing, and wherein the output shaft element is rotatably mounted by means of a shaft bearing arrangement on the drive shaft about the rotation axis.

Such a machine tool in the form of an impact driver is mentioned, for example, in DE 10 2007 003 037 A1. Practice has shown that the output pivot bearing of such an impact driver, that is, the pivot bearing near the tool receptacle, poorly resists the mechanical loads during impact operation. The torques and/or tilting moments applied to the drive train particularly affect the bearing which is farthest away from the drive motor. Tilting moments are for example caused by transversal forces which act on the tool. This bearing is configured as a ball bearing in the specification mentioned above and tends to earlier wear and tear A tilting moment is for example a force which acts transversely to the longitudinal extension of the drive train and particularly the longitudinal extension of the drive shaft onto the drive train or the drive shaft, respectively.

DE 195 36 557 A1 discloses a tool attachment for endoscopes having two axially adjacent bearings. DE 10 2017 209 013 A1 discloses a handheld machine tool having a securing unit wherein two different bearings are provided.

It is therefore the problem of the present invention to provide an improved impact driver.

SUMMARY OF THE INVENTION

To solve this problem, the shaft bearing arrangement in a handheld machine tool, particularly an impact driver, of the type mentioned at the outset comprises at least two shaft bearings arranged next to each other in relation to the rotation axis and differ in at least one mechanical property.

Another definition of the invention is for example provided by an impact driver which is configured as follows:

An impact driver having a drive train for driving a tool receptacle provided for receiving a tool, particularly a screwdriver tool, about a rotation axis, wherein the drive train comprises a drive motor and an impact mechanism, wherein the drive train comprises a drive shaft which can be driven by the drive motor for driving an impactor of the impact mechanism, wherein the impactor is provided for driving an output shaft member on which the tool receptacle is arranged by means of rotary impacts, wherein the output shaft member is rotatably mounted about the rotation axis by means of an output pivot bearing, and the drive shaft is rotatably mounted in relation to a machine housing by means of a drive bearing, and wherein the output shaft member is rotatably mounted about the rotation axis by means of a shaft bearing arrangement on the drive shaft, and wherein the shaft bearing arrangement comprises at least two shaft bearings which are arranged next to each other with respect to the rotation axis and differ in at least one mechanical property.

It should be noted at this point that a bearing principle according to the invention can also be appropriately used for other types of handheld machine tools, such as sawing machines, particularly handheld circular saws, routers, or the like.

The mechanical property can for example be that one shaft bearing can withstand greater mechanical stress than another shaft bearing. Furthermore, the shaft bearings may include different types of bearings, such as roller bearings, slide bearings, or predetermined different roller bearing types, such as needle bearings and ball bearings. For example, a slide bearing can be provided as a shaft bearing near the output pivot bearing, while at a distance therefrom a roller bearing, particularly a ball bearing or roll bearing, is provided as a shaft bearing.

It is a basic idea in this context that the one shaft bearing has for example a different support property from the other shaft bearing. For example, the one shaft bearing, particularly the one which is arranged closer to the output pivot bearing, may have a greater support force or support a greater tilting moment than the other shaft bearing. It goes without saying that other shaft bearings, for example, three or four shaft bearings, can be provided.

It is preferred that the at least one mechanical property includes different bearing diameters of at least two of the shaft bearings. The different bearing diameters thus for example include different diameters of an output shaft of the output shaft member and accordingly different diameters of a bearing receptacle of the drive shaft for the output shaft. The greater bearing diameter can absorb or receive greater forces.

Advantageously, the at least two shaft bearings of the shaft bearing arrangement are supported at different support lengths with respect to the rotation axis on the drive shaft. For example, a roller bearing or slide bearing extends over a longer length with respect to the rotation axis than another roller bearing or slide bearing. The various support lengths can support different forces.

In an advantageous concept, a shaft bearing of the shaft bearing arrangement which is arranged closer to the output pivot bearing has a greater bearing diameter and/or is supported at a shorter support length on the drive shaft in relation to the rotation axis than a shaft bearing of the shaft bearing arrangement which is farther away from the output pivot bearing. In this configuration, the shaft bearing arranged closer to the output pivot bearing can take higher loads in terms of tilting moments or support moments, while the one away from the output pivot bearing must or should absorb a smaller load.

It is advantageous if there is a distance or free space parallel to the rotation axis between at least two shaft bearings of the shaft bearing arrangement. This allows the implementation of defined bearing properties. That distance can for example be just a portion of the length of a respective bearing section, particularly slide bearing section, of one or both or multiple shaft bearings relative to the rotation axis, that is, relatively short or small. However, greater distance or intermediate spaces between bearing sections of the shaft bearings are conceivable as well. For example, one shaft bearing can be arranged at the one length region and another shaft bearing can be arranged at the other length region of the output shaft or the output shaft member.

Expediently, at least one shaft bearing of the shaft bearing arrangement is a slide bearing. But it is easily possible as well that a shaft bearing is a roller bearing, particularly a roll bearing, needle bearing, ball bearing, or the like. Particularly preferred is a configuration in which all shaft bearings of the shaft bearing arrangement are slide bearings.

The output shaft member advantageously has a slide bearing section which is mounted on an inner circumference or a bearing receptacle of the drive shaft. For example, the respective length of this slide bearing section or a contact region of the slide bearing section and the bearing receptacle determines a support length of the respective shaft bearing.

In addition to the slide bearing section, there is a relief groove or an oblique and/or rounded contour to an adjacent section, particularly another slide bearing section, of the output shaft member. This helps reduce of prevent notch stresses or the like, for example.

A bearing receptacle of the drive shaft for the output shaft member and/or an output shaft of the output shaft member mounted on the drive shaft advantageously comprises a stepped contour extending transversely to the rotation axis. A stepped contour can for example be provided in that the output shaft has different bearing diameters in the region of the various shaft bearings.

Advantageously, at least two shaft bearings of the shaft bearing arrangement are supported on the drive shaft at different first and second support lengths. For example, the one shaft bearing can be longer than the other shaft bearing in relation to the rotation axis. A bearing section of the one shaft bearing, particularly a slide bearing section of the one shaft bearing, is accordingly longer than the one of at least one other shaft bearing.

Expediently, a shaft bearing of the shaft bearing arrangement arranged closer to the drive pivot bearing rests on the drive shaft at a greater support length than a shaft bearing of the shaft bearing arrangement arranged closer to the output pivot bearing. Still, it is advantageous if the shaft bearing having the smaller support length has the greater bearing diameter, such that it can absorb greater forces.

It is advantageous if shaft bearings of the shaft bearing arrangement arranged next to each other relative to the rotation axis have different bearing clearances transversely to the rotation axis. For example, a relatively long bearing section of a shaft bearing can have a bearing clearance which is greater than the bearing clearance of a shorter bearing section of another shaft bearing, such that the shaft bearing having the long bearing section still is not mechanically overstressed. This is the case in the following configuration, for example.

In an advantageous concept, a shaft bearing of the shaft bearing arrangement arranged closer to the output pivot bearing has a smaller bearing clearance across the rotation axis than a shaft bearing located farther away from the output pivot bearing. For example, the shaft bearing closer to the output pivot bearing accordingly absorbs more forces transversely to the rotation axis.

It is further an advantage if a first shaft bearing having a shorter support length relative to the rotation axis is supported on the drive shaft as a second shaft bearing of the shaft bearing arrangement. A shaft bearing having a shorter support length can still support greater forces, for example if its bearing diameter is respectively greater.

It is expedient, for example, if the support length of the shaft bearing arranged closer to the output pivot bearing is smaller than the support length of a shaft bearing arranged farther away from the output pivot bearing and/or approximately matches the support length of the output pivot bearing.

Torque transmission and/or tilting moment transmission and/or bending moment transmission and/or the respective support, for example tilting moment support, are optimal. Stress on the bearings is low.

Advantageously, the output shaft member is supported over an overall support length of the shaft bearing arrangement in relation to the rotation axis on the drive shaft and over a support length of the output pivot bearing in relation to the rotation axis at the machine housing, and the overall support length of the shaft bearing arrangement is greater than the support length of the output pivot bearing in relation to the longitudinal extension of the rotation axis. The overall support length is the sum total of the support lengths at which the shaft bearings, for example a first and a second shaft bearings, of the shaft bearing arrangement support the output shaft member at the drive shaft member. For example, the overall support length is defined by a length of bearing sections of the output shaft which are mounted on bearing sections of the drive shaft by means of a slide bearing or roller bearing.

It is a basic idea in this context that the output shaft or the output shaft member is supported via a relatively long longitudinal length or longitudinal extension relative to the rotation axis by means of the shaft bearing arrangement. The overall support length of the shaft bearing arrangement is therefore greater than a support length of the output pivot bearing. In this way, the output shaft member can be optimally supported by the drive pivot shaft as well. This means that the shaft bearing arrangement is arranged between the drive pivot bearing and the output pivot bearing, wherein the output shaft and the output shaft member are mounted or supported against each other over a relatively long length in relation to the rotation axis.

In a preferred exemplary embodiment, the overall support length of the shaft bearing arrangement is at least one and a half times or twice as great as the support length of the output pivot bearing. Thus the overall support length of the shaft bearing arrangement is significantly longer than that of the output pivot bearing.

Further preferred is even an overall support length of the shaft bearing arrangement at least three or four times as great, particularly five or six time as great, further preferred seven or eight times as great as the support length of the output pivot bearing. The overall support length of the shaft bearing arrangement can also be nine, ten, eleven times as great as the support length of the output pivot bearing.

It is further preferred if an output shaft of the output shaft member, which shaft could also be called a bearing shaft, is relatively long but has a small cross section. For example, a length of the output shaft of the output shaft member supported on the shaft bearing arrangement is at least twice as great, particularly preferred even three times as great, as a diameter of the output shaft. For example, a stick-shaped or elongate output shaft member projects in the direction of the drive shaft and is supported by the shaft bearing arrangement.

The hand-held machine tool expediently is an impact driver. The drive train then includes an impact mechanism with an impactor for driving the output shaft member by means of rotary impacts.

Advantageously, the impactor has a bearing receptacle in which the drive shaft is arranged. The impactor can for example be mounted on the drive shaft. The shaft bearing arrangement also extends into the bearing receptacle, preferably over at least half its length relative to the rotation axis. The total length of the shaft bearing arrangement can also be arranged in the bearing receptacle. It should be noted that the shaft bearing arrangement itself does not have to be mounted in the bearing receptacle, just the output shaft does.

Preferably, the output shaft member penetrates the impactor over a portion of its longitudinal extension relative to the rotation axis or even projects from the impactor. For example, an output shaft of the output shaft member, which could also be called a bearing shaft, penetrates the impactor. It is possible that the output shaft extends over the entire longitudinal extension of the drive shaft. It is preferred, however, that the output shaft member does not project from the impactor towards the drive pivot bearing. For example, the output shaft member extends over about half or two thirds of the longitudinal extension of the impactor.

It is further an advantage if the impactor is axially movably mounted on the drive shaft along a bearing region extending along the rotation axis and that the output shaft member is supported on the drive shaft by means of the shaft bearing arrangement over a portion of the length of the bearing region, for example about half of the bearing region or even the entire length of the bearing region. The support of the output shaft member, particularly the output shaft, is advantageously provided in that region of the drive shaft in which the axial back and forth movement of the impactor takes place.

It is further expedient if the shaft bearing arrangement has a bearing receptacle in which or on which an output shaft of the output shaft member is received. The output shaft is supported in relation to the rotation axis on the bearing receptacle over the overall support length of the shaft bearing arrangement. For example, the bearing receptacle extends over the entire length of the output shaft in relation to the rotation axis of the drive train.

The drive shaft could in principle also be provided at an output of the drive motor. This is particularly an option if the drive motor is a so-called direct drive.

It should be noted at this point that the drive motor is preferably an electric motor, particularly a brushless or electronically commutated motor. But it is also possible that the drive motor is a pneumatic motor or air motor, for example. The bearing concept according to the invention and optimum support in relation to the machine housing can also be used for other drive concepts.

In a preferred embodiment of the invention, the drive shaft is formed by an output of a transmission, such as a planetary gear system or another gear train, which itself is driven by the drive motor. Thus the drive motor drives the transmission, which itself provides the drive shaft on which the output shaft member is mounted.

The shaft bearing arrangement can expediently extend to an end face of a gearwheel of the transmission from which the output shaft projects and/or extends over the entire length of the drive shaft.

It is preferred if the drive pivot bearing rotatably supports the gearwheel. But it is also possible that the drive pivot bearing supports another gearwheel or another component of the transmission, on which the gearwheel is rotatably mounted or which meshes with the gearwheel.

The drive pivot bearing is expediently arranged between the drive motor and the transmission. For example, the drive pivot bearing represents an input pivot bearing of the transmission. It is conceivable that the transmission does not have a pivot bearing apart from the drive pivot bearing and output pivot bearing which is supported on the machine housing or a transmission housing which will be explained below.

It is further preferred if a drive shaft driven by the drive motor or a drive gear of the transmission driven by the drive motor is arranged in an interior space of the drive pivot bearing. The drive pivot bearing can for example rotatably support the gearwheel mentioned above relative to the machine housing and/or a transmission housing, wherein a passage opening for the drive gear is provided on the gearwheel, for example a planetary carrier. The drive gear is for example a sun gear of a planetary gear system or of the transmission configured as a planetary gear system.

The output pivot bearing expediently includes a slide bearing or roller bearing. A roll bearing or needle bearing is preferred.

It is an advantage if the output pivot bearing is exclusively a radial bearing or at any rate provides optimum support in the radial direction. The output pivot bearing preferably does not provide support with respect to the longitudinal extension of the rotation axis or along the rotation axis. Thus the output shaft member is not braked or supported by the output pivot bearing relative to the rotation axis, bit it is radially supported.

It is possible that the output pivot bearing and/or the drive pivot bearing are fixedly supported at the machine housing of the hand-held machine tool, particularly the impact driver. For example, bearing receptacles may be provided at the machine housing for the output pivot bearing and/or the drive pivot bearing.

It is further possible that the output pivot bearing and/or the drive pivot bearing are held at a transmission housing of the drive train. The transmission housing is fixedly arranged in the machine housing of the hand-held machine tool, particularly the impact driver. The transmission housing can also be fixedly arranged at the machine housing in that it projects from the machine housing, particularly from a front opening of the machine housing.

It is preferred if the transmission housing encapsulates the transmission including the impact mechanism.

The transmission housing for example comprises a first and a second encapsulation elements, which particularly can be plugged onto each other and/or are flange-connected to each other. The shell elements can for example be configured as shell receptacle and shell cover.

It is furthermore expedient if the drive motor is arranged outside the transmission housing. But it is generally possible that the drive motor is arranged inside the transmission housing.

The drive pivot bearing is expediently arranged at an input opening of the transmission housing.

The output pivot bearing is expediently arranged at an output opening of the transmission housing. Thus the drive pivot bearing and the output pivot bearing are advantageously arranged on the input and output side, respectively.

It should be noted at this point that a motor bearing can also be or support the drive pivot bearing. For example, a rotor of the drive motor can be mounted for rotation about a rotation axis by means of a pivot bearing in relation to the transmission housing or the machine housing or both. The pivot bearing can be or support the drive pivot bearing.

In another embodiment of the invention, the output shaft member has at least one rotary stop for the impactor, for example of the type of laterally projecting cams or wings.

A control transmission is advantageously provided between the impactor and the output shaft for generating an axial movement of the impactor relative to the output shaft along the rotation axis and/or a rotational movement of the impactor relative to the output shaft when an axial force is applied by a spring which actuates the impactor in the direction of the output shaft member.

The output shaft member expediently comprises an anvil body which interacts with the impactor. The tool receptacle is preferably arranged at the anvil body. But it is also possible that the anvil body is integral with the tool receptacle.

The drive shaft mounted on the shaft bearing arrangement is expediently arranged in a rotationally fixed manner or rotatably mounted on the anvil body.

The anvil body and the output shaft expediently consist of different materials and/or differ in hardness. For example, the anvil body can be a hardened or harder component than the drive shaft. The output shaft itself is not deformed by the process of hardening, that is, it is not geometrically impaired by the hardening process.

BRIEF DESCRIPTION OF THE DRAWINGS

An exemplary embodiment of the invention is explained below with reference to the drawing. Wherein:

FIG. 1 shows a side view of a hand-held machine tool in the form of an impact driver, of which

DETAILED DESCRIPTION

Figure 1:
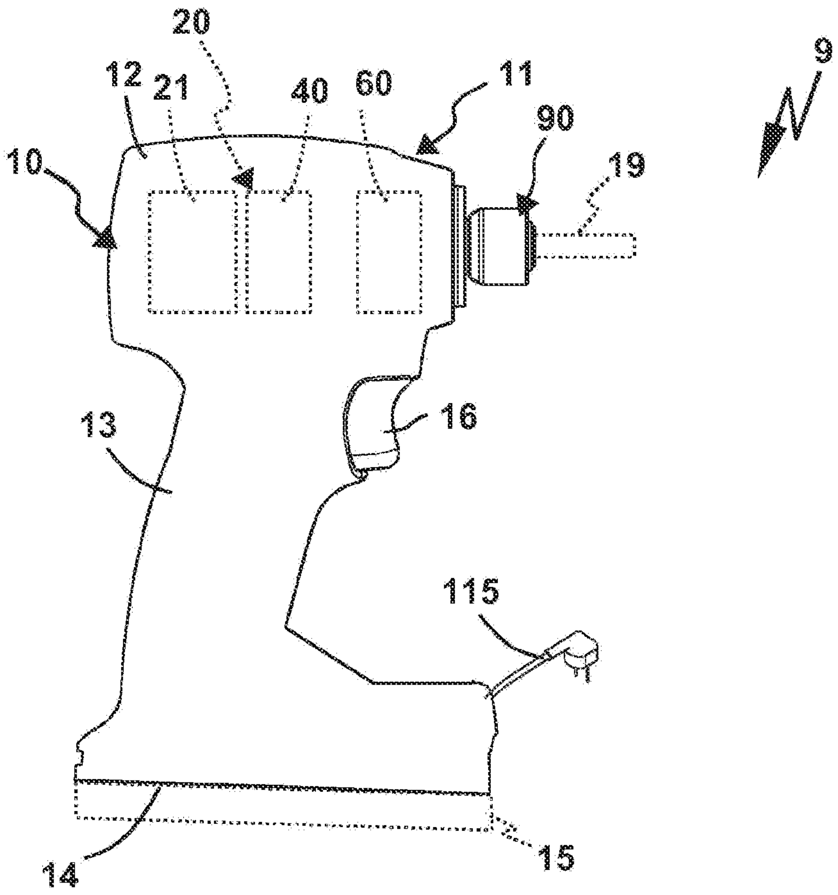

A hand-held machine tool 9 in the form of an impact driver 10 has a machine housing 11, in the drive section 12 of which a drive train 20 is accommodated. A handle section 13 which can be gripped by an operator projects away from the drive section 12. The hand-held machine tool 9 is an electrical hand-held machine tool that works with electric power. This power can be provided, for example, by an electric energy storage 15, particularly a battery pack or the like and/or an electric power grid to which the hand-held machine tool 9, particularly the impact driver 10, can be connected, for example by means of a connecting cable 115.

The electric energy storage 15, particularly a battery pack, can for example be connected to an electric connection interface 14, which can for example be provided at the end region of the handle section 13, which is opposite the drive section 12. The details do not matter in this context. The drive train 20 can be actuated by means of an electric switch 16 in that pressing the drive switch 16 energizes an electric drive motor 21.

Instead of the electric drive motor 21, a pneumatic motor or a motor driven by another type of energy could be provided at any time as well. The mechanical components described below could also be operated using a drive concept which is not using an electric drive motor.

The drive motor 21 has a stator 22, which for example includes an excitation coil arrangement and a core stack. The drive motor 21 can for example be a universal motor or particularly a brushless or electronically commutated motor. The switch 16 can for example be used to activate an electronic commutation device.

The motor bearings 25, 26 are accommodated at bearing receptacles of a motor carrier 29 or the stator 22. A permanent magnet arrangement and/or coils and/or a squirrel-cage rotor of the rotor 23 may for example extend between the motor bearings 25, 26.

A rotor 23 is rotatably mounted in relation to the stator 22 by means of motor bearings 25, 26. The motor bearings 25, 26 support a motor shaft 24 of the drive motor 21 for rotation about a rotation axis D.

At a free end region, for example near the motor bearing 25, an impeller 27 is provided which generates a cooling air stream when the drive motor 21 is in operation. The cooling air stream cools the drive motor 21 and/or other components of the drive train 20, for example.

An output 28 of the drive motor 21 drives a transmission 40 of the drive train 20. The transmission 40 has a transmission drive 41, which is coupled in a rotationally fixed manner to the output 28 of the drive motor 21, for example by means of intermeshing form-fitting contours, by pressing together or the like of the output 28 and the transmission drive 41.

The transmission 40 is preferably configured as a planetary gear system, but other types of transmissions, particularly gear trains or gearwheel transmissions are likewise conceivable. The transmission 40 comprises a sun gear 42, for example, which is coupled in a rotationally fixed manner to the transmission drive 41 or integral therewith. The sun gear 42 meshes with planetary gears 43 which are rotatably mounted to a planetary carrier 45 by means of axle elements 44. The axle elements 44 can be rotatably mounted on the planetary carrier 45. But it is also possible that the planetary gears 43 are rotatably mounted on the axle elements 44. In this region, ball bearings, needle bearings, or other roller bearings, but also slide bearings are easily conceivable.

The planetary gears 43 are accommodated in planetary gear receptacles 46 of the planetary carrier 45. The radially outer circumference of the planetary gears 43 projects radially outwards from a planetary gear receptacle 46, such that the planetary gears 43 can mesh with a gearing of an internal gear 54. For example, the planetary carrier 45 has opposing walls 47A, 47B or end walls in which bearing receptacles 47 or holding receptacles for the axle elements 44 are provided. The planetary gear receptacles 46 are provided between the walls 47A, 47B. A peripheral wall 47C of the planetary carrier 45 has recesses in which the planetary gear receptacles 46 are provided.

The planetary carrier 45 is rotatably mounted on a transmission housing 51 of the transmission 40 and therefore also in relation to the machine housing 11 by means of a drive pivot bearing 50. The transmission housing 51 is supported at the machine housing 11.

For example, the transmission housing 51 has a bearing receptacle 52 for the drive pivot bearing 50. The bearing receptacle 52 and the drive pivot bearing 50 are provided on the side of the transmission 40 facing the drive motor 21.

In addition to the bearing receptacle 52, a internal gear support region 53 for the internal gear 54 is provided. The internal gear 54 is thus supported with respect to the transmission housing 51 and held in a rotationally fixed manner.

It should be noted at this point that a transmission having an internal gear is possible within the scope of the invention, which internal gear can engaged with or disengaged from various gear stages or planets of a transmission, for example by shifting parallel to the rotation axis D or by another shifting mechanism to implement various gears or shifting stages of a transmission.

The planetary carrier 45 is used to drive a drive shaft 48. The drive shaft 48 projects, for example, from an end face of the planetary carrier 45 towards a tool receptacle 90 of the hand-held machine tool 9, particularly the impact driver 10.

The impact driver 10 does have an impact mechanism 60 in which the shaft bearing arrangement 49 explained below can be used advantageously. But it is also easily possible that a shaft bearing arrangement according to the invention, for example a shaft bearing arrangement 49, can also be advantageously used in other types of handheld machine tools, for example in sawing machines or the like.

The drive shaft 48 further projects towards the impact mechanism 60 of the impact driver 10.

The drive shaft 48 projects, for example, from the wall 47B. The drive shaft 48 is preferably a body integrally connected to the wall 47B, but it could also be another component molded onto the same. At any rate, the drive shaft 48 is fixedly connected to, preferably integral with, the planetary carrier 45.

The impact mechanism 60 drives an output shaft member 80. An output shaft 81 of the output shaft member 80 engages in a bearing receptacle 149 of the shaft bearing arrangement 49 of the drive shaft 48 of the transmission 40. The output shaft 81 is rotatably mounted in the bearing receptacle 149, preferably by means of a slide bearing. The shaft bearing arrangement 49 could also be a roller bearing, particularly a needle bearing, which facilitates or improves the rotatable mounting of the output shaft 81 in the bearing receptacle 149.

Figure 2:
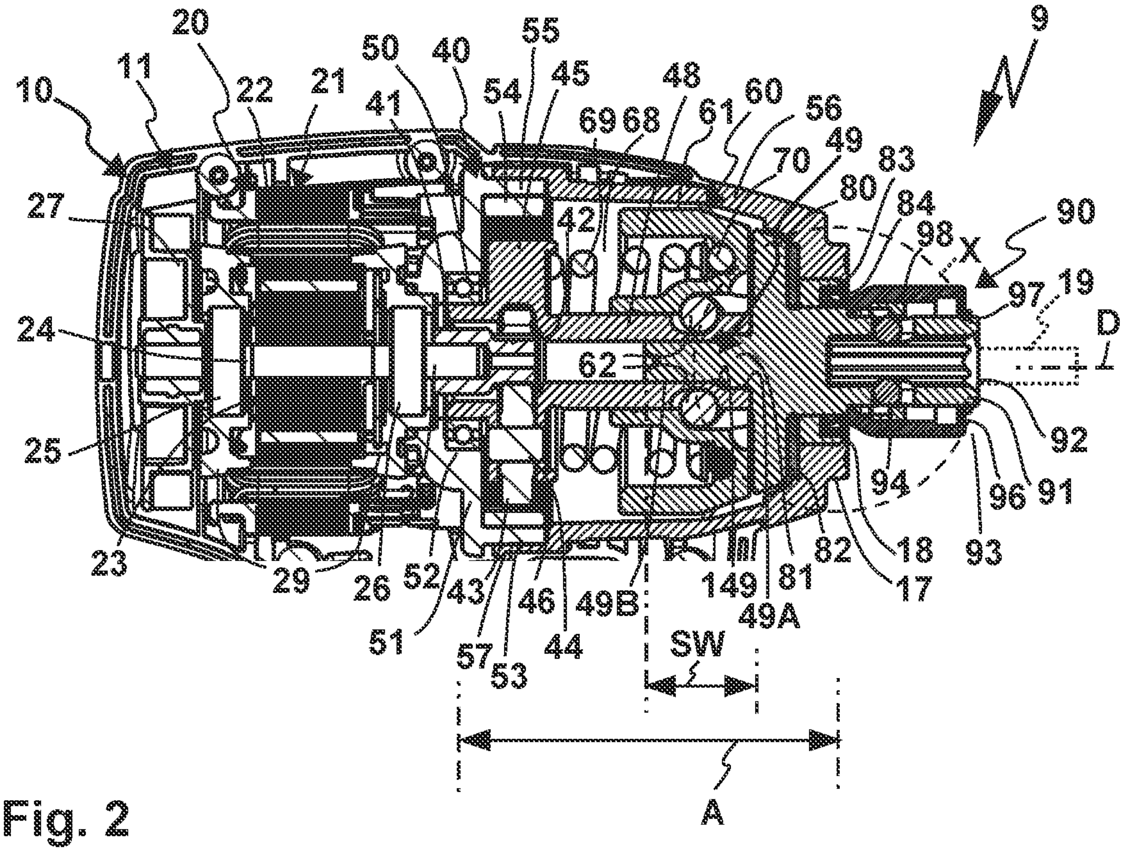
FIG. 2 shows a cross section.

The impact mechanism 60 includes an impactor 61, which is driven by the drive shaft 48 of the transmission 40. The drive shaft 48 engages in a bearing receptacle 61A of the hammer body 61. An end face or a free end region of the drive shaft 48 projects to an end face 61B of the impactor 61. The two end faces of the drive shaft 48 and the impactor 61 are flush, for example in the position according to FIG. 2.

A control transmission 63 is provided between the transmission 40, particularly the drive shaft 48, and the impactor 61. For example, control curves 63A, 63B, which are overall V-shaped or helical, are provided on the drive shaft 48 Drive bodies 62, such as balls, are provided in the control curves 63A, 63B. The drive bodies 62 engage in control surfaces 64 of the impactor 61, which are for example provided on the end face 61B. The control surfaces 64 preferably also include control curves 65, such as V-shaped or helical grooves.

During a rotational movement of the drive shaft 48, the drive bodies 62, as it were, roam back and forth in the V-shaped grooves or control curves 63, causing rotary entrainment of the impactor 61 against the force of a spring 69.

Figure 4:
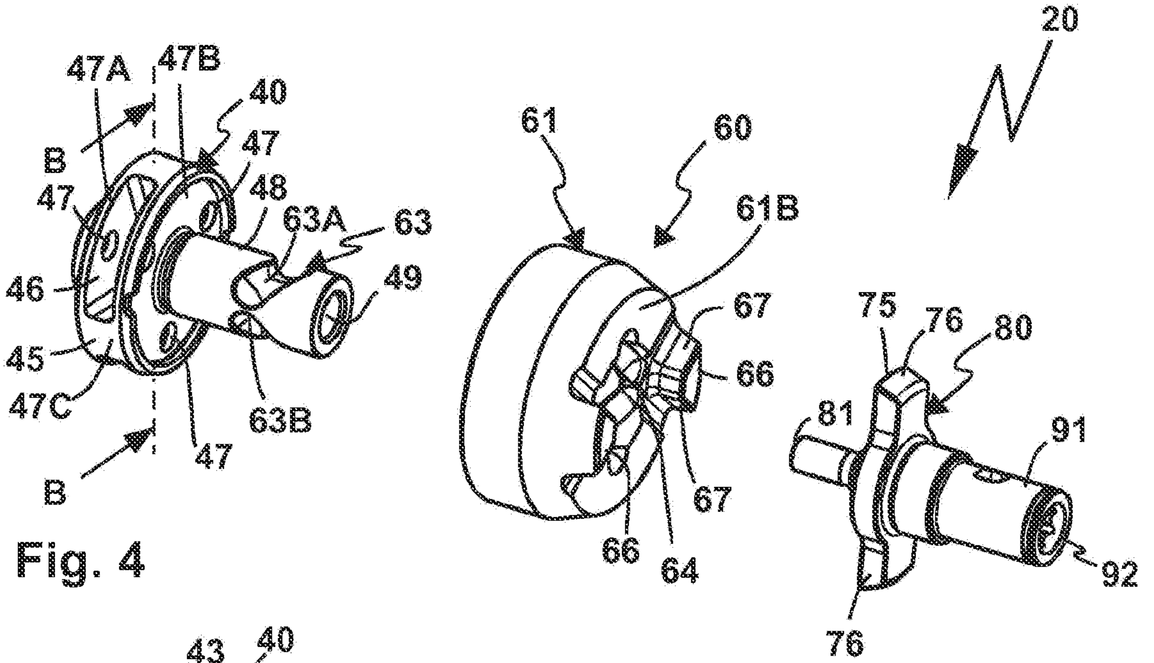
FIG. 4 shows an oblique perspective view of a part of a drive train of the hand-held machine tool according to the preceding figures.
Figure 5:
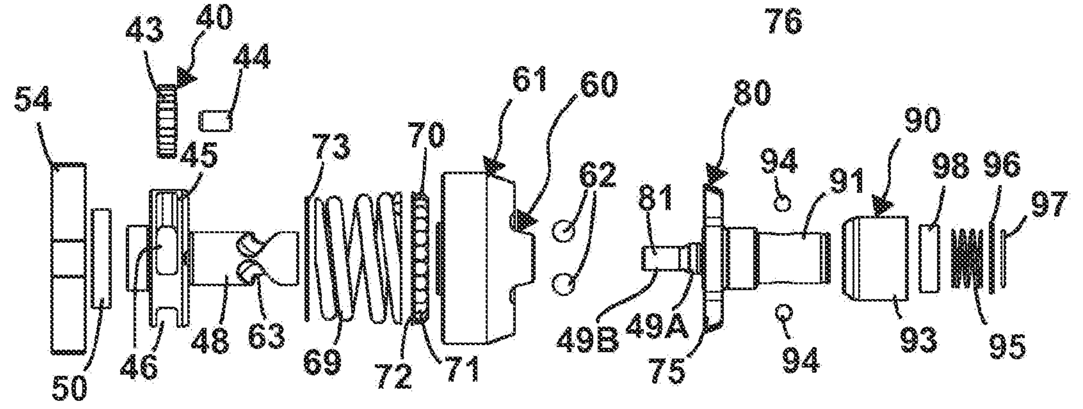
FIG. 5 shows a side view of the drive train according to FIG. 4.
Figure 6:
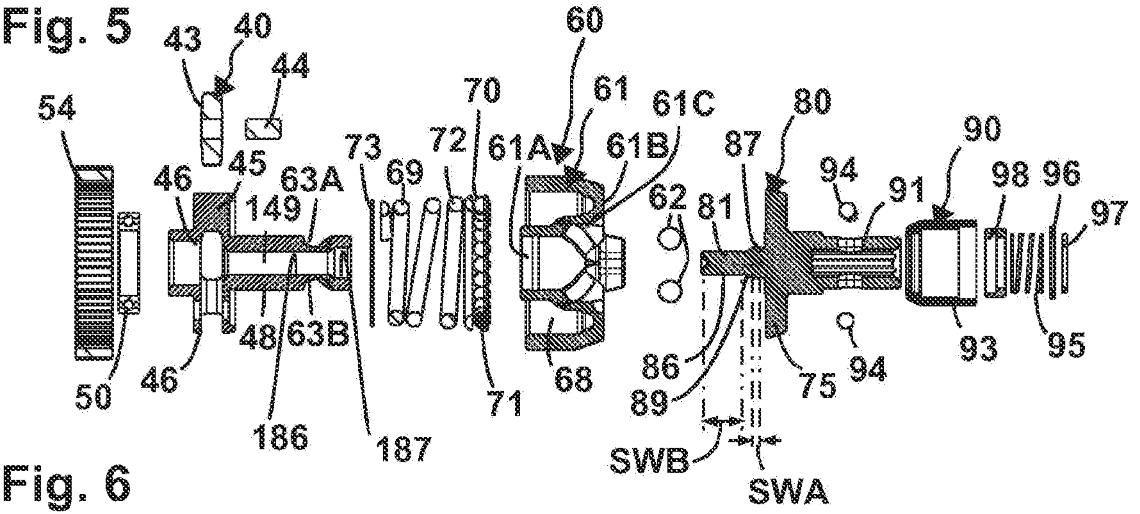
FIG. 6 shows a cross section through the drive train according to FIG. 5 approximately along a line B-B in FIG. 4 or 7.

The control curves 63A, 63B and the control curves 65 are V-shaped in opposite directions, which is well visible in FIGS. 4 and 5, for example. It would suffice that the control curves 63A, 63B on the one hand or the control curves 65 on the other hand are configured as V-shaped or helical grooves. Due to the helical shape or V-shape of the control curves 63A, 63B, 65, a particularly great stroke with respect to the rotation axis D or a particularly wide axial adjustment of the impactor 61 with respect to the drive shaft 48, or a great rotary acceleration of the impactor 61 is generated if a force is applied thereto by the spring 69 in the direction of the anvil body 65. The control transmission 63 thus in general is a transmission which converts an axial movement of the impactor 61 due to the spring 69 into a rotary movement and thus a percussive pulse about the rotation axis D, or in the opposite direction screwing the impactor 61 along the drive shaft 48 away from the anvil body 75, wherein the spring 69*i* is tensioned until the impactor 61 can rotate above the anvil body 65 to subsequently perform the above-mentioned rotary impacts onto the anvil body 65.

Figure 7:
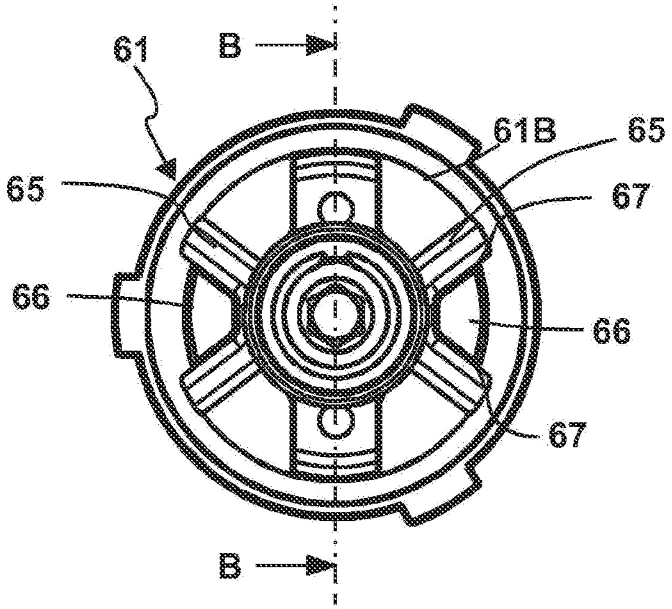
FIG. 7 shows a front view of an impactor of the drive train according to the preceding figures.

The spring 69 is one the one hand supported at the planetary carrier 45, particularly by means of a bearing washer or via a bearing washer 73. Furthermore, the spring 79 is supported at the impactor 61. It engages in a spring receptacle 68 on the rear side or on the side facing away from the end face 61B of the impactor 61. Preferably, a bearing 70, particularly a ball bearing with balls 72 is provided between the spring 69 and the spring receptacle 68 or at any rate the support surface for the spring 69 in the spring receptacle 68. Preferably, a support body 72, such as a washer, is provided between the spring 69 and the balls of the bearing 71, which of course could also be a roller bearing with other roller bodies, particularly rolls. The control curves 63 and the control surfaces 64 are for example configured as V-shaped grooves running in opposite directions. If the impactor 61 takes its position at a spacing from the transmission 40 or the front position shown in FIG. 2, in which the impactor 61 is arranged at the proximal end region of the drive shaft 48, the control balls or drive bodies 42 are located in the respective peaks of the V-shaped control curves 63 or control surfaces 64. If a greater counter torque than a threshold counter torque is applied from the outside to the output shaft member 80, the impactor 61 performs an axial movement away from the output shaft member 80 against the spring force of the spring 69, that is, to the left in FIGS. 2 and 7, such that it rotates past the output shaft member 80 and subsequently moves forward again into a front position due to the spring force of the spring 69. The engaging output projections 66 of the impactor 61 act on the output shaft member 80 in the process, namely onto an anvil element or an anvil body 75 of the same. The anvil body 75 has engaging output projections 76, which are arranged between the engaging drive projections 66. Impact surfaces 67 of the engaging drive projections 66 act laterally on the engaging output projections 76 and generate an impact-like torque for the output shaft member 80, such that said member is subjected to rotary entrainment or rotary impacts in the respective direction of rotation of the drive shaft 48.

The control curves 65 and 63A, 63B so to speak double the axial movement path of the impactor 61 with respect to the drive shaft 48.

A tool receptacle 90 for a tool 19, for example a drill or particularly a screwdriver bit, is provided on the output shaft member 80. The tool receptacle 90 comprises a plug receptacle 92 on a receiving body 91. The receiving body 91 extends in extension of the rotation axis D to the output shaft 81 and away from the output shaft member 80. The receiving body 91 could be a body connected to the output shaft member 80; in the present case, the receiving body 91 is preferably integral with the output shaft member 80 and particularly with the output shaft 81. This ensures a particularly high torsional rigidity and stability. An operating element 93 is provided on the outer circumference of the receiving body 91 for operating locking elements 94.

The operating element 93 is preferably configured as a sleeve which is mounted on the receiving body 91 for movement along the rotation axis D. A spring 95 is supported at the receiving body 61 in the region of a plug-in opening of the plug receptacle 92 relative to the rotation axis D by means of washers 96, 97. The other, opposing longitudinal end region of the spring 91 forces the operating element 93 into a locking position, in which said element forces locking elements 94, particularly balls, radially inwards into the plug receptacle 92 by means of a holding element 98, such that the locking elements 94 positively engage in locking receptacles 119 of the tool 19. The tool 19 is locked in this manner in the plug receptacle 92 or secured against being pulled out.

If the operating element 93 is moved against the force of the spring 95 in the direction of the plug-in opening of the plug receptacle 92, that is, into an unlocking position, the locking elements 94 can get radially outwards from the plug receptacle 92 into the region of a release receptacle 99 of the operating element 93, such that the positive connection of the locking elements 94 and the locking receptacles 119 of the tool 19 is released. The tool 19 can then be taken from the plug-in opening or plug receptacle 92.

Inserting the tool 19 is also possible by means of a holding element 98 if the operating element 93 is not operated in the direction of its unlocking position, that is, to the right in the drawing, against the force of the spring 95. When plugging the tool 19 into the plug receptacle 92, the locking elements 94 can operate the holding element 98 against the force of the spring 95 in the direction of the free end or the plug-in opening of the plug receptacle 92, whereby the locking elements 94 can get further radially outwards and displace the holding element 98 against the force of the spring 95, such that it is possible to insert the tool 19 into the plug receptacle 92.

The output shaft member 80 is supported on the machine housing 11 by means of an axial bearing 82. The axial bearing 82 rests, for example, on a wall section 17 of the machine housing 11. The wall section 17 is provided in the region of a passage opening 18 of the machine housing 11 where the drive train 20 projects from the machine housing 11 with the tool receptacle 90, particularly the receiving body 91. As a rule, no force is applied to the axial bearing 82, because the adjusting path or movement path of the impactor 61 at the output shaft 81 is defined by the control transmission 63.

An output pivot bearing 83, for example, a ball bearing or particularly a slide bearing, is provided at the passage opening 18. The output pivot bearing preferably is a radial bearing, particularly an exclusively radially supportive bearing. The drive train 20 is mounted for rotation about the rotation axis D relative to the machine housing 11 in the region of the tool receptacle 90 by means of the output pivot bearing 83. The other support with respect to the machine housing 11 is provided by the drive pivot bearing 50, which have a distance A from each other. Within the distance A, no rotary support of the drive train 20 on the machine housing 11 is provided between, on the one hand, the output 28 of the drive motor 30 and the tool receptacle 90, particularly the receiving body 91, on the other hand. A specific radial support is at best provided to the planetary gears 43 at the internal gear 54, which itself is supported at the internal wheel support region 53 of the transmission housing 51. The internal gear support region 53 receives an outer radial support by a housing lid 56, which is placed upon a basic housing body 55 of the transmission housing 51 and covers it in the region of the impact mechanism 60. The transmission 40 is received in the basic housing body 55. The basic housing body 55 engages in a receptacle 57 of the housing lid 56. In the region of the receptacle 57, the internal gear support region 53 is supported in the radially outward direction.

The housing lid 56 forms an anterior frontal region of the machine housing 11 and comprises the above-mentioned wall section 17 and the passage opening 18. The machine housing 11 and the transmission housing 51 can easily be in one piece or have identical components. At any rate, a structurally sound support or rotational mounting of the drive train 20 by the drive pivot bearing 50 and the output pivot bearing 83 is provided relative to a radial support or rotational support relative to the rotation axis D within the distance A. This means that the two pivot bearings 50, 83 are decisive with respect to the machine housing 11 when it comes to the radial support or rotational support of the drive train 20 relative to the machine housing 11.

The shaft bearing arrangement 49 extends over a portion of the length of the drive shaft 48, that is, over a portion between the planetary carrier 45 and the end face of the anvil body 75. For example, the shaft bearing arrangement 49 extends across about half the length of the drive shaft 48. This means that the shaft bearing arrangement 49 is that long that an overall support length SW of the shaft bearing arrangement 49 in relation to the rotation axis D is substantially greater, for example, three to four times as great as a support length SD of the output pivot bearing 63. The output pivot bearing 63 is therefore a particularly short pivot bearing relative to the rotation axis D. This makes the impact driver 10, particularly its drive train 20, very short in relation to the rotation axis D.

Likewise advantageously, a diameter of the output shaft 81 is relatively small, at any rate substantially smaller than the length of the output shaft 81. At any rate, the length of the output shaft 81 which is supported by the shaft bearing arrangement 49, is at least three to four times, preferably five to six times as great as the smaller diameter DAB or the larger diameter DAA of the output shaft 81.

Figure 3:
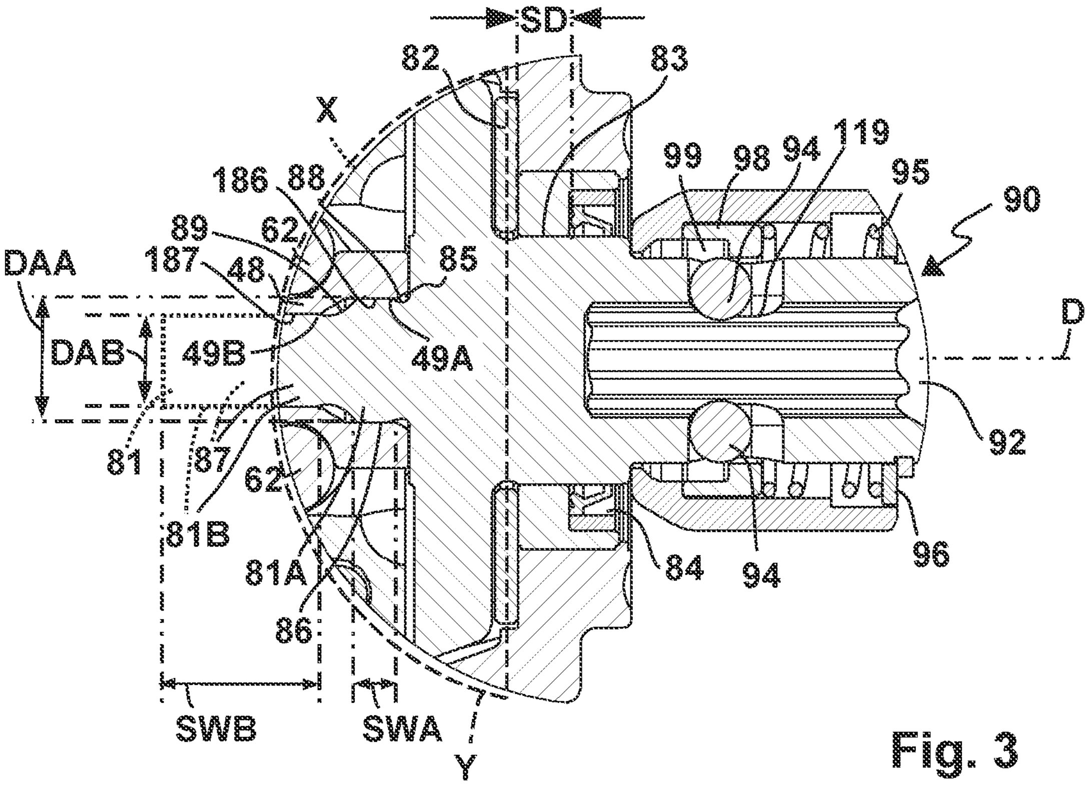
FIG. 3 shows a detail X from FIG. 2.

It should be noted for better understanding at this point that the support length SD, which is well visible in FIG. 3, is particularly short because an additional seal 84, particularly a shaft seal, is arranged next to or at the output pivot bearing 83. The seal 84 sealingly rests against the output shaft member 80 radially on the outside, particularly against the receiving body 91, for example.

The output shaft 81 is rotatably received in the bearing receptacle 149.

The shaft bearing arrangement 49 has shaft bearings 49A, 49B arranged at a distance from each other or next to each other relative to the rotation axis D.

The shaft bearing 49A is arranged closer to the output pivot bearing 83, the shaft bearing 49B is arranged closer to the drive pivot bearing 50. While the shaft bearing 49A is arranged directly next to the output pivot bearing 83, the shaft bearing 49B has a longitudinal distance from the drive pivot bearing 50 in relation to the rotation axis D. Particularly, the shaft bearing 49B extends to a longitudinal center of the tool receptacle 149 in relation to the rotation axis D.

Output shaft section 81A, 81B, which are arranged next to each other in relation to the rotation axis D on the output shaft, are provided with bearing elements 86, 87 or configured as bearing elements 86, 87. The bearing elements 86, 87 are rotatably mounted in bearing receptacles 186, 187, which form parts of the bearing receptacle 149. Thus the shaft bearings 49A, 49B are each slide bearings but have a mechanically different design.

The output shaft section 81A is shorter than the output shaft section 81B. Likewise, the bearing elements 86, 87 or the associated bearing receptacles 186, 187 differ in length in relation to the rotation axis D. Accordingly, the shaft bearings 49A, 49B have different support lengths SWA, SWB. The shaft bearing 49A is thus supported at a shorter support length SWA at the bearing receptacle 149 than the shaft bearing 49B at its support length SWB.

Still, the shaft bearing 49A carries the greater "support load," absorbs a higher tilting moment or support moment than the shaft bearing 49B. A bearing diameter DAA of the shaft bearing 49A, that is, a diameter of the bearing element 86 or bearing receptacle 186, is greater than a bearing diameter DAB of the shaft bearing 49B, that is, its bearing element 87 or bearing receptacle 187. Thus the shaft bearing 49A can absorb greater forces than the shaft bearing 49B.

The output shaft 81 has a stepped appearance in relation to the rotation axis D, a greater diameter or a greater step being provided near the anvil body 75.

The bearing element 87 projects from the bearing element 86 in the manner of a support shaft towards the drive pivot bearing 50.

The particularly stress resistant shaft bearing 49A has a greater stress resistance than the shaft bearing 49B with respect to forces that act across the rotation axis D. If, for example, the impact driver 10 falls to the ground, a high transverse or impact load can occur at the tool receptacle 90, particularly if a tool 19 is arranged at the tool receptacle 90. The output shaft member 80 is during such a movement subjected to a pivoting force or pivoting movement about the output pivot bearing 83, which is short in relation to the rotation axis D, but optimally supported by the shaft bearing 49A.

Furthermore, the spring 69 for example generates a tilting moment across the rotation axis D, which however is supported by the similarly stress-resistant shaft bearing 49A.

Figure 3A:
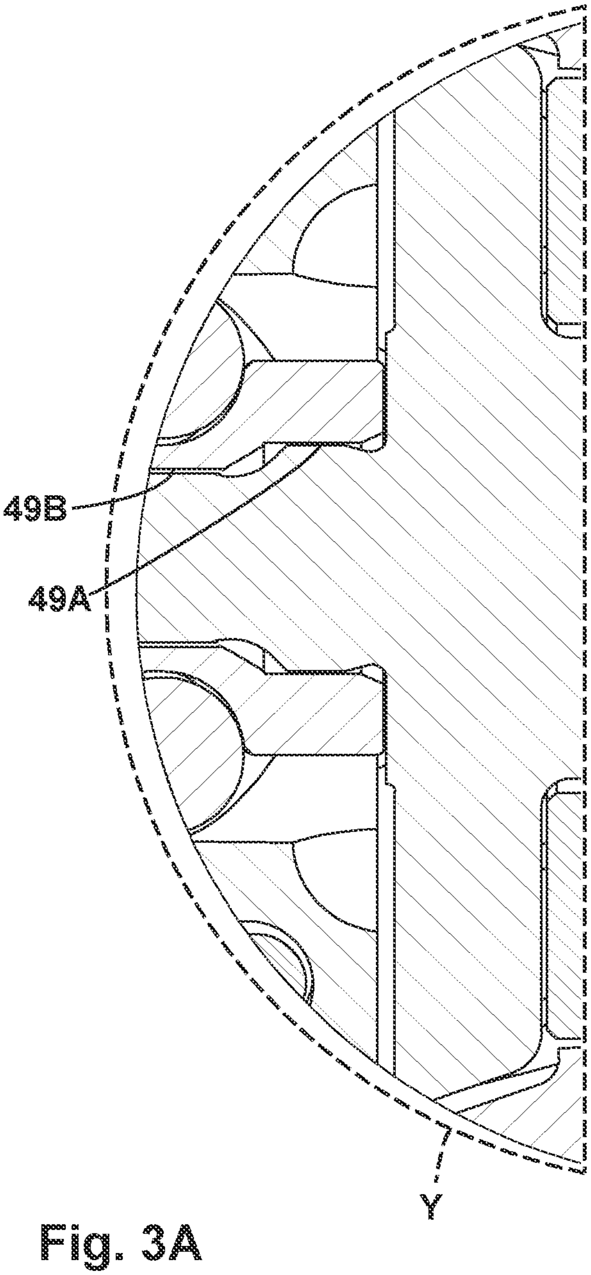
FIG. 3A shows a detail Y from FIG. 3.

To ensure that primarily the shaft bearing 49A absorbs a load across the rotation axis D of forces acting on the output shaft member 80, the shaft bearing 49A can have a smaller bearing clearance across the rotation axis D than the shaft bearing 49B, as shown in FIG. 3A.

It is in addition advantageous if the shaft bearings 49A, 49B are at a distance from the rotation axis D. For example, there can be a spacing between the support lengths SWA, SWB. There is a transitional area 89 between the bearing elements 86, 87, for example a relief groove, a radial recess in relation to the rotation axis D or the like. The transition 89 preferably is a continuous rounded and/or inclined transition to prevent or reduce stresses, such as notch stresses or the like, between the bearing elements 86, 87, which are integral with the output shaft 81.

It is likewise advantageous if a radial recess 88, for example, a relief groove, is provided between the anvil body 75 and the extension of the output shaft 81, that is, the bearing element 86. A low notch stress is intended there as well. But it is an advantage if, for example, a rounded transitional area is provided between the anvil body 75 and the extension of the output shaft 81, that is, the bearing element 86, instead of, or in addition to, the relief groove.

The invention claimed is:

1. A handheld machine tool, having a drive train for driving a tool receptacle, provided for receiving a tool about a rotation axis, wherein the drive train comprises a drive motor, an output shaft element, on which the tool receptacle is arranged, and a drive shaft, which is drivable by the drive motor, for driving the output shaft element, wherein the output shaft element is rotatably mounted by means of an output pivot bearing and the drive shaft is rotatably mounted by means of a drive pivot bearing about the rotation axis in respect of a machine housing, and wherein the output shaft element is rotatably mounted with respect to the drive shaft by means of a shaft bearing arrangement provided between the output shaft element and the drive shaft about the rotation axis and wherein the shaft bearing arrangement has at least two shaft bearings, which are arranged adjacent to each other in relation to the rotation axis and differ by at least one mechanical property, wherein the at least one mechanical property includes different bearing diameters of at least two of the shaft bearings, and wherein the at least two shaft bearings of the shaft bearing arrangement are radial bearings.

2. The hand-held machine tool according to claim 1, wherein the at least two shaft bearings of the shaft bearing arrangement are supported on the drive shaft at different support lengths in relation to the rotation axis.

3. The hand-held machine tool according to claim 1, wherein a shaft bearing of the shaft bearing arrangement which is arranged closer to the output pivot bearing has a greater bearing diameter and/or is supported at a shorter support length on the drive shaft in relation to the rotation axis than a shaft bearing of the shaft bearing arrangement which is farther away from the output pivot bearing.

4. The hand-held machine tool according to claim 1, wherein there is a distance or free space parallel to the rotation axis between at least two shaft bearings of the shaft bearing arrangement.

5. The hand-held machine tool according to claim 1, wherein at least one bearing of the shaft bearing arrangement is a slide bearing.

6. The hand-held machine tool according to claim 5, wherein the output shaft element has at least one slide bearing section which is mounted on an inner circumference or a bearing receptacle of the drive shaft.

7. The hand-held machine tool according to claim 6, wherein in addition to the slide bearing section, there is a relief groove or an oblique and/or rounded contour to an adjacent section of the output shaft member.

8. The hand-held machine tool according to claim 1, wherein a bearing receptacle of the drive shaft for the output shaft element and/or an output shaft of the output shaft member mounted on the drive shaft comprises a stepped contour extending transversely to the rotation axis.

9. The hand-held machine tool according to claim 1, wherein at least two shaft bearings of the shaft bearing arrangement are supported on the drive shaft at different first and second support lengths in relation to the rotation axis.

10. The hand-held machine tool according to claim 1, wherein a shaft bearing of the shaft bearing arrangement arranged closer to the drive pivot bearing rests on the drive shaft at a greater support length than a shaft bearing of the shaft bearing arrangement arranged closer to the output pivot bearing.

11. The hand-held machine tool according to claim 1, wherein shaft bearings of the shaft bearing arrangement arranged next to each other relative to the rotation axis have different bearing clearances across the rotation axis.

12. The hand-held machine tool according to claim 1, wherein a first shaft bearing of the at least two shaft bearings of the shaft bearing arrangement is rotatably mounted in a first bearing receptacle arranged closer to the output pivot bearing and a second shaft bearing of the at least two shaft bearings of the shaft bearing arrangement is rotatably mounted in a second bearing receptacle located farther away from the output pivot bearing, and wherein a distance between a radial outer surface of the first shaft bearing and a radial inner surface of the first bearing receptacle in a direction transverse to the rotation axis is smaller than a distance between a radial outer surface of the second shaft bearing and a radial inner surface of the second bearing receptacle in the direction transverse to the rotation axis.

13. The hand-held machine tool according to claim 1, wherein a first shaft bearing having a shorter support length in relation to the rotation axis than a second shaft bearing of the shaft bearing arrangement is supported at the drive shaft.

14. The hand-held machine tool according to claim 1, wherein a support length of the shaft bearing arranged closer to the output pivot bearing is smaller than a support length of a shaft bearing arranged farther away from the output pivot bearing and/or approximately matches the support length of the output pivot bearing.

15. The hand-held machine tool according to claim 1, wherein the output shaft element is supported over an overall support length of the shaft bearing arrangement in relation to the rotation axis on the drive shaft and over a support length of the output pivot bearing in relation to the rotation axis at the machine housing, and the overall support length of the shaft bearing arrangement is greater than the support length of the output pivot bearing in relation to the longitudinal extension of the rotation axis.

16. The hand-held machine tool according to claim 15, wherein the overall support length of the shaft bearing arrangement is at least one and a half times or twice as great as the support length of the output pivot bearing in relation to the longitudinal extension of the rotation axis.

17. The hand-held machine tool according to claim 15, wherein the overall support length of the shaft bearing arrangement is at least three times as great as the support length of the output pivot bearing in relation to the longitudinal extension of the rotation axis.

18. The hand-held machine tool according to claim 15, wherein the overall support length of the shaft bearing arrangement is at least five times as great as the support length of the output pivot bearing in relation to the longitudinal extension of the rotation axis.

19. The hand-held machine tool according to claim 15, wherein the overall support length of the shaft bearing arrangement is at least seven times as great as the support length of the output pivot bearing in relation to the longitudinal extension of the rotation axis.

20. The hand-held machine tool according to claim 15, wherein the overall support length of the shaft bearing arrangement is at least nine times as great as the support length of the output pivot bearing in relation to the longitudinal extension of the rotation axis.

21. The hand-held machine tool according to claim 1, wherein a length of the output shaft of the output shaft element supported on the shaft bearing arrangement is at least twice as great, as a diameter of the output shaft.

22. The hand-held machine tool according to claim 1, wherein the shaft bearing arrangement comprises a bearing receptacle in which or at which an output shaft of the output shaft element is received, wherein the output shaft is supported on the bearing receptacle in relation to the rotation axis of the shaft bearing arrangement.

23. The hand-held machine tool according to claim 1, wherein the drive train includes an impact mechanism with an impactor for driving the output shaft member by means of rotary impacts.

24. The hand-held machine tool according to claim 23, wherein the impactor has a bearing receptacle in which the drive shaft is arranged and into which the shaft bearing, arrangement extends at least over half its length in relation to the rotation axis and/or wherein the output shaft element penetrates the impactor over a portion of its entire longitudinal extension in relation to the rotation axis, or projects from the impactor.

25. The hand-held machine tool according to claim 23, wherein the impactor is axially movably mounted on the drive shaft along a bearing section on the drive shaft extending along the rotation axis and the output shaft member is supported over at least a portion of the length of the bearing section on the drive shaft by means of the shaft bearing arrangement.

26. The hand-held machine tool according to claim 1, wherein the shaft bearing arrangement is arranged in an interior space of the machine housing.

27. The handheld machine tool according to claim 1, wherein the shaft bearing arrangement is arranged between the output pivot bearing and the drive motor.

28. A handheld machine tool, having a drive train for driving a tool receptacle, provided for receiving a tool about a rotation axis, wherein the drive train comprises a drive motor, an output shaft element, on which the tool receptacle is arranged, and a drive shaft, which is drivable by the drive motor, for driving the output shaft element, wherein the output shaft element is rotatably mounted by means of an output pivot bearing and the drive shaft is rotatably mounted by means of a drive pivot bearing about the rotation axis in respect of a machine housing, and wherein the output shaft element is rotatably mounted with respect to the drive shaft by means of a shaft bearing arrangement provided between the output shaft element and the drive shaft about the rotation axis and wherein the shaft bearing arrangement has at least two shaft bearings, which are arranged adjacent to each other in relation to the rotation axis, and differ by at least one mechanical property, wherein the at least one mechanical property includes different bearing diameters of at least two of the shaft bearings, and wherein the at least two shaft bearings of the shaft bearing arrangement are slide bearings.

29. A handheld machine tool, having a drive train for driving a tool receptacle, provided for receiving a tool about a rotation axis, wherein the drive train comprises a drive motor, an output shaft element, on which the tool receptacle is arranged, and a drive shaft, which is drivable by the drive motor, for driving the output shaft element, wherein the output shaft element is rotatably mounted by means of an output pivot bearing and the drive shaft is rotatably mounted by means of a drive pivot bearing about the rotation axis in respect of a machine housing, and wherein the output shaft element is rotatably mounted with respect to the drive shaft by means of a shaft bearing arrangement provided between the output shaft element and the drive shaft about the rotation axis and wherein the shaft bearing arrangement has at least two shaft bearings, which are arranged adjacent to each other in relation to the rotation axis, and wherein a first shaft bearing of the at least two shaft bearings of the shaft bearing arrangement is rotatably mounted in a first bearing receptacle and a second shaft bearing of the at least two shaft bearings of the shaft bearing arrangement is rotatably mounted in a second bearing receptacle, each of the first shaft bearing and the first bearing receptacle having a diameter respectively greater than a diameter of the second shaft bearing and the second bearing receptacle in the direction transverse to the rotation axis.

* * * * *